US012165504B2

(12) United States Patent
Sakurada et al.

(10) Patent No.: US 12,165,504 B2
(45) Date of Patent: *Dec. 10, 2024

(54) CONTROL METHOD FOR VISUALLY MARKING A PEDESTRIAN CROSSING, MARKING DEVICE, AND SYSTEM

(71) Applicant: TOYOTA JIDOSHA KABUSHIKI KAISHA, Toyota (JP)

(72) Inventors: Shin Sakurada, Toyota (JP); Kazuya Nishimura, Anjo (JP); Soutaro Kaneko, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,875

(22) Filed: Oct. 13, 2023

(65) Prior Publication Data

US 2024/0054886 A1 Feb. 15, 2024

Related U.S. Application Data

(63) Continuation of application No. 17/702,935, filed on Mar. 24, 2022, now Pat. No. 11,823,563.

(30) Foreign Application Priority Data

Jun. 11, 2021 (JP) ................................ 2021-098274

(51) Int. Cl.
*G08G 1/005* (2006.01)
*E01F 9/582* (2016.01)

(52) U.S. Cl.
CPC .................................... *G08G 1/005* (2013.01)

(58) Field of Classification Search
None
See application file for complete search history.

(56) References Cited

U.S. PATENT DOCUMENTS 4,020,597 A 5/1977 Shigyo et al.
6,384,742 B1 * 5/2002 Harrison ................ E01F 9/559 340/925

(Continued)

FOREIGN PATENT DOCUMENTS

CN 111629472 A 9/2020
JP 2012-022948 A 2/2012

(Continued)

OTHER PUBLICATIONS

Jul. 20, 2023 Notice of Allowance issued in U.S. Appl. No. 17/702,935.

(Continued)

*Primary Examiner* — John F Mortell
(74) *Attorney, Agent, or Firm* — Oliff PLC

(57) ABSTRACT

Provided is a method executed by a marking device that marks a first pedestrian crossing to be visually recognized by a pedestrian who is going to cross a roadway and a second pedestrian crossing to be visually recognized by a driver of a vehicle on the roadway. The method includes: marking the first pedestrian crossing and the second pedestrian crossing when one or more conditions including at least a condition that a first pedestrian who is going to cross the roadway from a first side to a second side is detected are satisfied; starting to unmark the first pedestrian crossing from the first side to the second side while the first pedestrian is crossing the roadway; and unmarking the second pedestrian crossing when the first pedestrian has finished crossing the roadway.

7 Claims, 6 Drawing Sheets

(56) References Cited

U.S. PATENT DOCUMENTS

| | | | | |
|---|---|---|---|---|
| 6,597,293 | B1 * | 7/2003 | Harrison | G08G 1/005 340/944 |
| 7,688,222 | B2 * | 3/2010 | Peddie | G08G 1/096783 116/63 P |
| 7,777,646 | B2 | 8/2010 | Konforty et al. | |
| 10,550,532 | B2 * | 2/2020 | Trifan | F21V 23/0485 |
| 2009/0091474 | A1 * | 4/2009 | Konforty | G08G 1/095 340/907 |
| 2012/0148104 | A1 | 6/2012 | Nanri et al. | |
| 2018/0174460 | A1 | 6/2018 | Jung et al. | |
| 2020/0356111 | A1 | 11/2020 | Takemura et al. | |
| 2022/0281381 | A1 | 9/2022 | Clochard et al. | |
| 2023/0095384 | A1 | 3/2023 | Sharma Banjade et al. | |
| 2023/0206755 | A1 | 6/2023 | Jha et al. | |

FOREIGN PATENT DOCUMENTS

| | | | |
|---|---|---|---|
| JP | 2013-096201 | A | 5/2013 |
| JP | 2014-225151 | A | 12/2014 |

OTHER PUBLICATIONS

Mar. 13, 2023 Office Action issued in U.S. Appl. No. 17/702,935.

Sep. 16, 2024 Notice of Allowance issued in U.S. Appl. No. 17/709,850.

* cited by examiner

CONTROL METHOD FOR VISUALLY MARKING A PEDESTRIAN CROSSING, MARKING DEVICE, AND SYSTEM

CROSS-REFERENCE TO RELATED APPLICATION

This application is a Continuation of application Ser. No. 17/702,935, filed on Mar. 24, 2022, which claims priority to Japanese Patent Application No. 2021-098274, filed on Jun. 11, 2021. The prior applications are hereby incorporated by reference in their entirety.

BACKGROUND

1. Technical Field

The present disclosure relates to a method, a marking device, and a system.

2. Description of Related Art

Conventionally, there is known a technique for causing a human being such as a pedestrian or a driver to recognize a pedestrian crossing on a road on which a vehicle such as an automobile travels. For example, Japanese Unexamined Patent Application Publication No. 2014-225151 (JP 2014-225151 A) discloses that a pseudo pedestrian crossing is presented on the windshield of a vehicle.

SUMMARY

There was room for improvement in the technique for causing a human being to recognize a pedestrian crossing on a road.

The purpose of the present disclosure made in view of such circumstances is to improve the technique for causing a human being to recognize a pedestrian crossing on a road.

A method according to an embodiment of the present disclosure is a method executed by a marking device that marks a first pedestrian crossing to be visually recognized by a pedestrian who is going to cross a roadway and a second pedestrian crossing to be visually recognized by a driver of a vehicle on the roadway. The method includes: marking the first pedestrian crossing and the second pedestrian crossing when one or more conditions including at least a condition that a first pedestrian who is going to cross the roadway from a first side to a second side is detected are satisfied; starting to unmark the first pedestrian crossing from the first side to the second side while the first pedestrian is crossing the roadway; and unmarking the second pedestrian crossing when the first pedestrian has finished crossing the roadway.

A marking device according to an embodiment of the present disclosure is a marking device including a control unit that marks a first pedestrian crossing to be visually recognized by a pedestrian who is going to cross a roadway and a second pedestrian crossing to be visually recognized by a driver of a vehicle on the roadway. The control unit marks the first pedestrian crossing and the second pedestrian crossing when one or more conditions including at least a condition that a first pedestrian who is going to cross the roadway from a first side to a second side is detected are satisfied, starts to unmark the first pedestrian crossing from the first side to the second side while the first pedestrian is crossing the roadway, and unmarks the second pedestrian crossing when the first pedestrian has finished crossing the roadway.

A system according to an embodiment of the present disclosure is a system including: a plurality of pedestrian light sources each installed on a roadway; a plurality of vehicle light sources each installed on the roadway; and a marking device that marks, using the pedestrian light sources, a first pedestrian crossing to be visually recognized by a pedestrian who is going to cross the roadway and that marks, using the vehicle light sources, a second pedestrian crossing to be visually recognized by a driver of a vehicle on the roadway. The marking device marks the first pedestrian crossing and the second pedestrian crossing when one or more conditions including at least a condition that a first pedestrian who is going to cross the roadway from a first side to a second side is detected are satisfied, starts to unmark the first pedestrian crossing from the first side to the second side while the first pedestrian is crossing the roadway, and unmarks the second pedestrian crossing when the first pedestrian has finished crossing the roadway.

According to the embodiment of the present disclosure, a technique for causing a human being to recognize a pedestrian crossing on a road is improved.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described.

Outline of Embodiment

Figure 1:
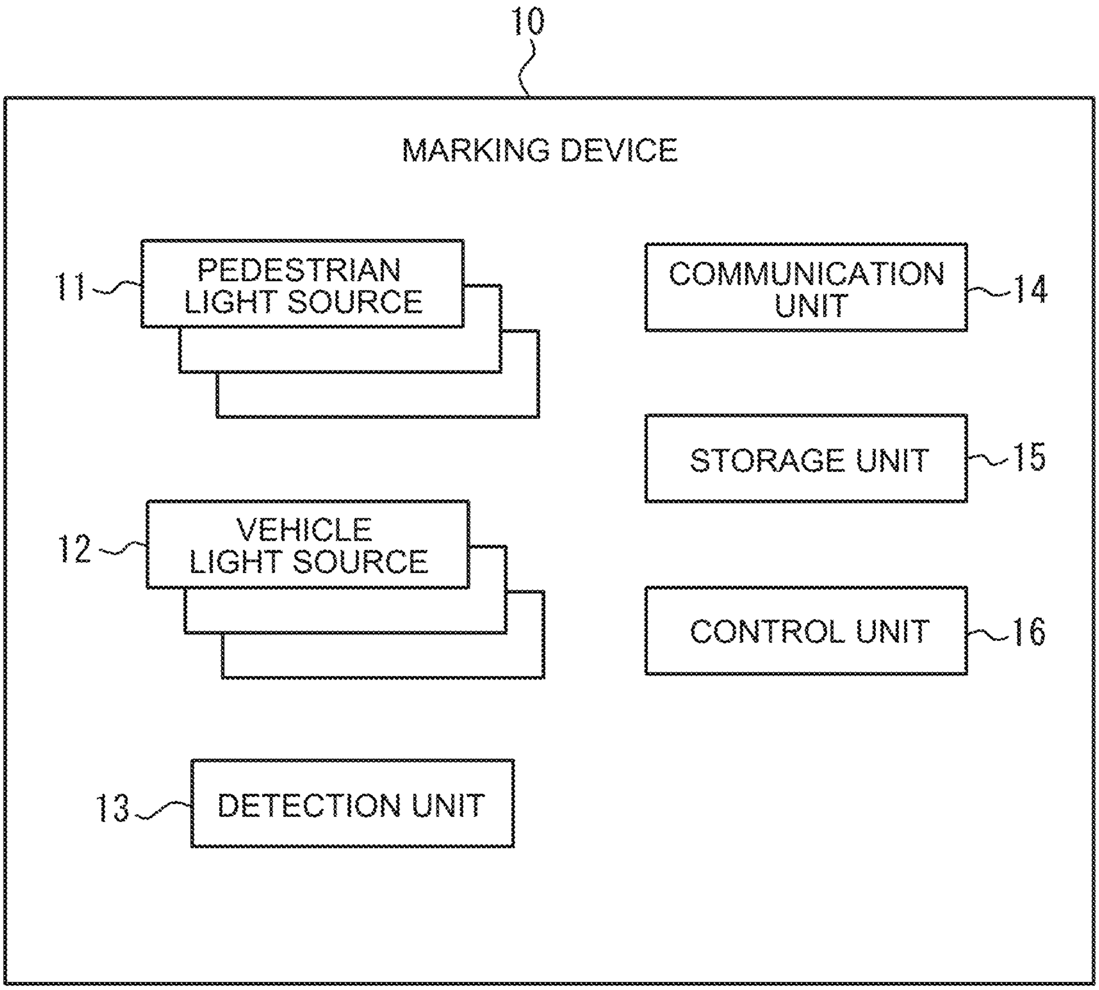
FIG. 1 is a block diagram showing a schematic configuration of a marking device according to an embodiment of the present disclosure.

The outline of a marking device 10 according to an embodiment of the present disclosure will be described with reference to FIGS. 1 and 2. Generally, the marking device 10 is a device for marking a pedestrian crossing on a roadway on which a vehicle such as an automobile travels. The marking device 10 shown in FIG. 1 includes a plurality of pedestrian light sources 11, a plurality of vehicle light sources 12, a detection unit 13, a communication unit 14, a storage unit 15, and a control unit 16.

Each of the pedestrian light sources 11 and the vehicle light sources 12 include one or more light emitting elements. The light emitting element is, for example, a light emitting diode (LED), a laser diode, or the like, but is not limited to these.

Each of the pedestrian light sources 11 is installed on the roadway so as to emit light in a width direction of the roadway. For example, the pedestrian light sources 11 may include a mask that shields light in a direction other than the width direction of the roadway (for example, an extension direction of the roadway). Alternatively, the light of the pedestrian light sources 11 may have directivity in the width direction of the roadway.

Each of the vehicle light sources 12 is installed on the roadway so as to emit light in the extension direction of the roadway. The "extension direction" is a direction in which the roadway extends, and is substantially orthogonal to, for example, the width direction of the roadway. For example, the vehicle light sources 12 may include a mask that shields light in a direction other than the extension direction of the roadway (for example, the width direction of the roadway). Alternatively, the light of the vehicle light sources 12 may have directivity in the extension direction of the roadway.

Figure 2:
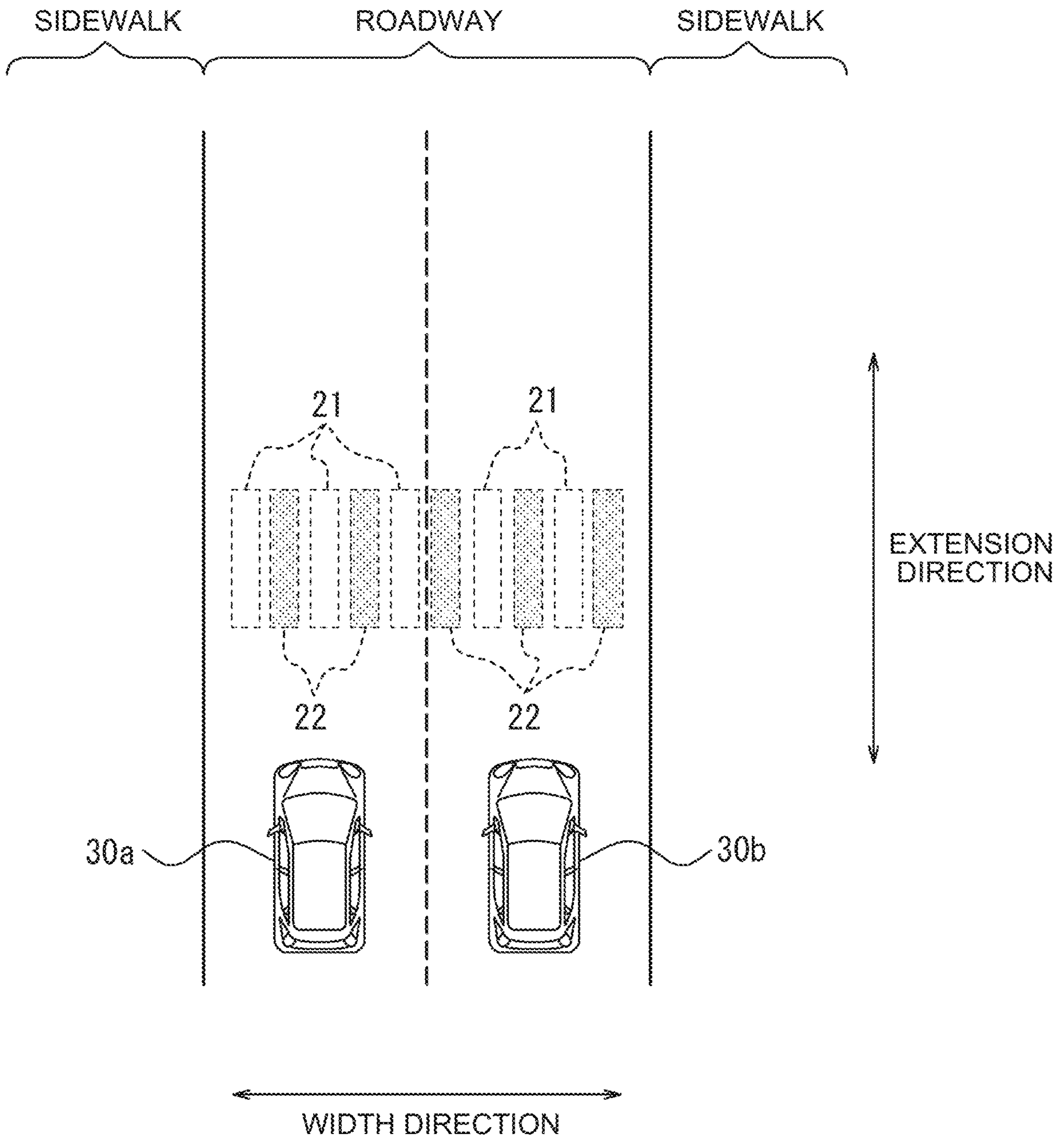
FIG. 2 is a diagram showing an example of a bird's-eye view of a roadway and sidewalks.

In the present embodiment, for example, as shown in FIG. 2, the pedestrian light sources 11 are installed so as to be distributed in a plurality of first regions 21 on the roadway. On the other hand, the vehicle light sources 12 are installed so as to be distributed in a plurality of second regions 22 on the roadway. The first regions 21 and the second regions 22 are alternately arranged side by side from one end side to the other end side in the width direction of the roadway. Each of the pedestrian light sources 11 and the vehicle light sources 12 may be embedded in the roadway, for example. Each of the pedestrian light sources 11 and the vehicle light sources 12 may be installed so as to project from a road surface of the roadway, may be installed so as to be recessed from the road surface, or may be installed so as to be flat to the road surface.

The light of the pedestrian light sources 11 is emitted in the width direction of the roadway as described above. For example, it is relatively easy for a pedestrian on a sidewalk located at each side of the roadway to visually recognize the light of each of the pedestrian light sources 11 that is arranged so as to be distributed in the first regions 21. However, it is relatively difficult for a driver of a vehicle 30 (30*a*, 30*b*) located on the roadway to visually recognize the light of each of the pedestrian light sources 11 that is arranged so as to be distributed in the first regions 21. Therefore, when the pedestrian light sources 11 are lit, the first regions 21 function as a first pedestrian crossing to be visually recognized by the pedestrian who is going to cross the roadway. In the present embodiment, "lighting" is not limited to, for example, continuously lighting the light source, and may include, for example, blinking the light source in a predetermined cycle or pattern.

On the other hand, the light of the vehicle light sources 12 is emitted in the extension direction of the roadway as described above. For example, it is relatively easy for a driver of the vehicle 30 located on the roadway to visually recognize the light of each of the vehicle light sources 12 that is arranged so as to be distributed in the second regions 22. However, it is relatively difficult for a pedestrian on a sidewalk located at each side of the roadway to visually recognize the light of each of the vehicle light sources 12 that is arranged so as to be distributed in the second regions 22. Therefore, when the vehicle light sources 12 are lit, the second regions 22 function as a second pedestrian crossing to be visually recognized by the driver of the vehicle 30 on the roadway.

In the example shown in FIG. 2, five first regions 21 and five second regions 22 are provided. The shapes of the first region 21 and the second region 22 are rectangular. However, the numbers, dimensions, shapes, and arrangements of the first region 21 and the second region 22 are not limited to the example shown in FIG. 2.

The detection unit 13 includes one or more cameras provided so as to be able to capture images of sidewalks and roadways. For example, a surveillance camera installed on the sidewalk may be adopted as the camera. The video of the camera of the detection unit 13 is used for detectinga pedestrian who is going to cross the roadway and a pedestrian who is crossing the roadway. The video of the camera of the detection unit 13 may be used for detecting a vehicle traveling on the roadway.

The communication unit 14 includes one or more communication interfaces for communicating with each of the pedestrian light sources 11, the vehicle light sources 12, and the detection unit 13 by wire or wirelessly. The communication interface for wireless communication supports, for example, mobile communication standards such as 4th generation (4G) or 5th generation (5G), or short-range wireless communication standards such as Wifi (registered trademark) or Bluetooth (registered trademark). The supported standards are not limited to these, and the communication interface may support any mobile communication standard. The communication unit 14 may communicate with each of the pedestrian light sources 11, the vehicle light sources 12, and the detection unit 13 via the Internet or an inter-terminal communication network, for example.

The storage unit 15 includes one or more memories. The memories are, for example, a semiconductor memory, a magnetic memory, or an optical memory, but are not limited to these memories. Each memory included in the storage unit 15 may function as, for example, a main storage device, an auxiliary storage device, or a cache memory. The storage unit 15 stores any information used for the operation of the marking device 10. For example, the storage unit 15 may store a system program, an application program, embedded software, and the like.

The control unit 16 includes one or more processors, one or more programmable circuits, one or more dedicated circuits, or a combination of these. The processors are, for example, a general-purpose processor such as a central processing unit (CPU) or a graphics processing unit (GPU), or a dedicated processor specialized for a specific process, but are not limited to these processors. The programmable circuits are, for example, a field-programmable gate array (FPGA), but are not limited to the circuit. The dedicated circuits are, for example, an application specific integrated circuit (ASIC), but are not limited to the circuit. The control unit 16 can communicate with each of the pedestrian light sources 11, the vehicle light sources 12, and the detection unit 13 via the communication unit 14. The communication unit 14, the storage unit 15, and the control unit 16 described above may be provided in, for example, one or more edge computers disposed along the roadway.

The control unit 16 controls the operation of the entire marking device 10. In the present embodiment, the control unit 16 can separately control the pedestrian light sources 11 and the vehicle light sources 12.

Operation Flow of Marking Device

Figure 3:
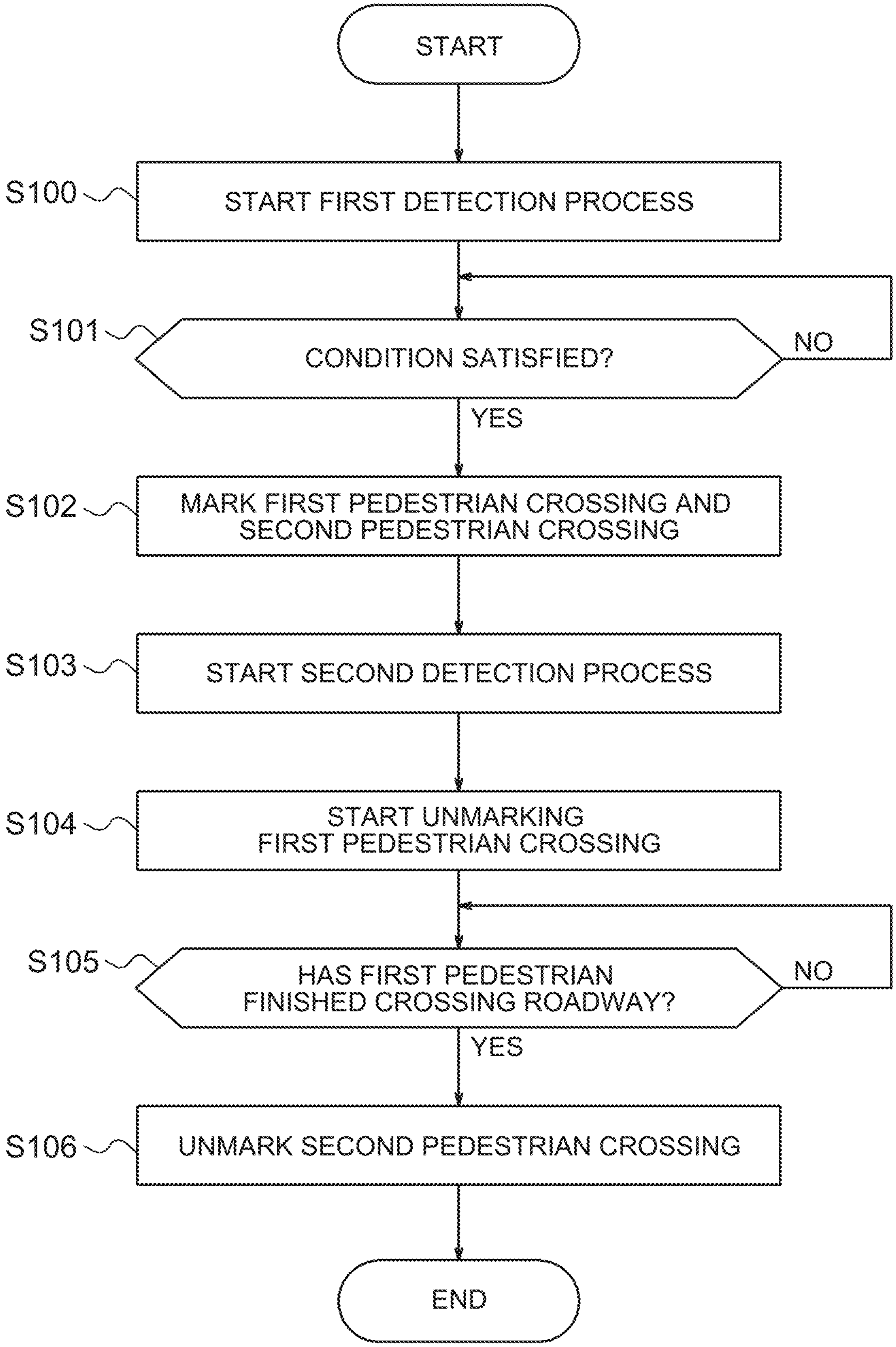
FIG. 3 is a flowchart showing an operation of the marking device.

The operation of the marking device 10 according to the present embodiment will be described with reference to FIG. 3.

Step S100: The control unit 16 of the marking device 10 starts a first detection process for detecting a pedestrian who is going to cross the roadway.

Specifically, the control unit 16 acquires a video captured by the camera of the detection unit 13. The control unit 16 executes any image recognition processing such as object recognition or skeleton recognition using the video, and starts detecting a pedestrian who is going to cross the roadway. Any method can be used to detect a pedestrian who is going to cross the roadway. For example, the control unit 16 may determine that the pedestrian who is going to cross the roadway has been detected when a predetermined time has elapsed while the pedestrian captured in the video faces the roadway without moving. Alternatively, the control unit 16 may determine that the pedestrian who is going to cross the roadway has been detected when the pedestrian captured in the video performs a predetermined action such as raising a hand.

Step S101: The control unit 16 determines whether one or more conditions including at least a condition that a first pedestrian who is going to cross the roadway from the first side to the second side is detected are satisfied. When it is determined that the one or more conditions are satisfied (step S101: Yes), the process proceeds to step S102. On the other hand, when it is determined that at least one of the one or more conditions is not satisfied (step S101: No), the process repeats step S101.

The "first side" and the "second side" are one side and the other side in the width direction of the roadway. In FIG. 2 and FIGS. 4 to 6, the "first side" is on the left side and the "second side" is on the right side, regarding the traveling direction of the vehicle 30 (30*a*, 30*b*) traveling on the roadway as the front. However, the "first side" and the "second side" may be opposite. In the example shown in FIG. 4, a first pedestrian 31 who is going to cross the roadway from the first side (left side) to the second side (right side) can be detected by the first detection process.

In addition to the condition that the first pedestrian who is going to cross the roadway from the first side (left side) to the second side (right side) is detected, the "one or more conditions" may further include, for example, any other condition to ensure the safety of the first pedestrian when crossing the roadway. The condition for ensuring safety is, for example, a condition that there is no vehicle 30 traveling at a predetermined speed or higher in an area within a predetermined distance from the detected first pedestrian, but the condition is not limited to this.

Step S102: When it is determined in step S101 that the one or more conditions are satisfied (step S101: Yes), the control unit 16 marks the first pedestrian crossing and the second pedestrian crossing.

Specifically, the control unit 16 transmits a control signal instructing lighting to the pedestrian light sources 11 and the vehicle light sources 12 via the communication unit 14. Each of the pedestrian light sources 11 and each of the vehicle light sources 12 that have received the control signal are turned on.

Figure 4:
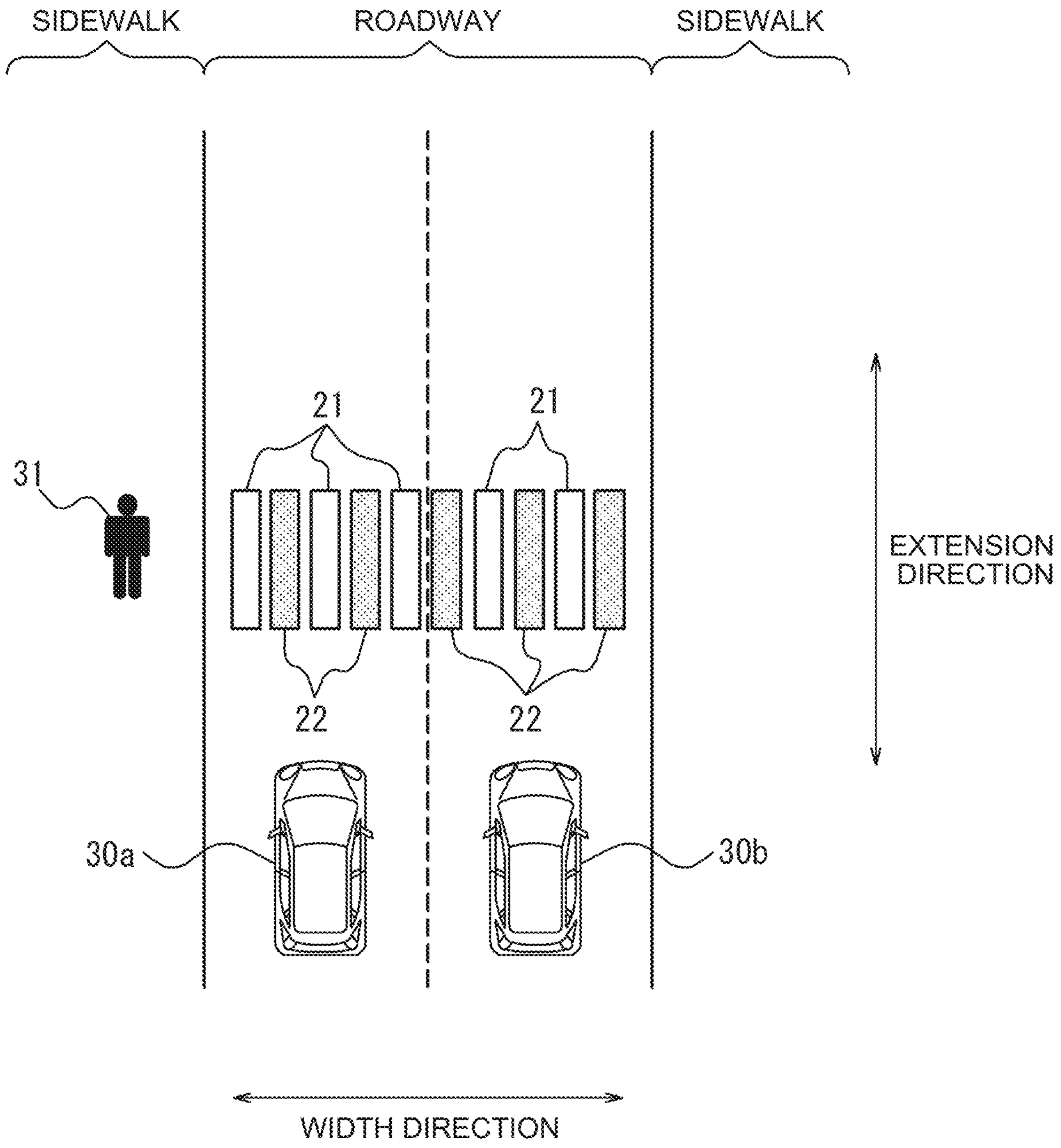
FIG. 4 is a diagram showing an example of a pedestrian crossing marked on the roadway.
Figure 5:
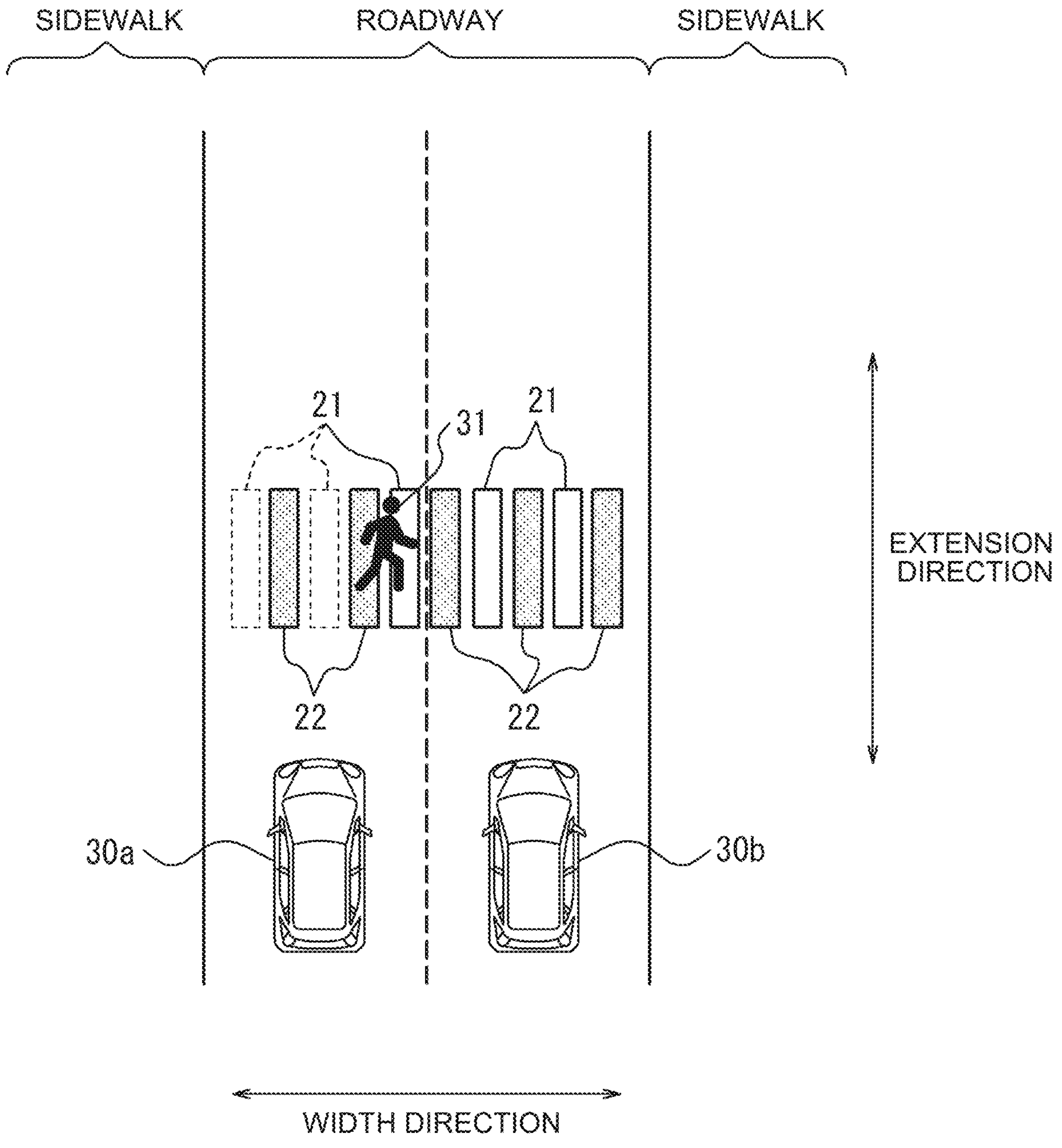
FIG. 5 is a diagram showing an example of the pedestrian crossing marked on the roadway.

As described above, the pedestrian light sources 11 are arranged so as to be distributed in the first regions 21 on the roadway. Therefore, the pedestrian on the sidewalk (for example, the first pedestrian 31) can visually recognize the first pedestrian crossing marked by the first regions 21 that emit light as shown in FIG. 4. The first pedestrian 31 confirms that the vehicle 30 does not exist on the roadway, or that the vehicle 30 (vehicles 30*a* and 30*b* in FIG. 4) is temporarily stopped before the first pedestrian crossing, and then can start crossing the roadway along the first pedestrian crossing. As described above, it can be relatively difficult for the driver of the vehicle 30 on the roadway to visually recognize the first pedestrian crossing marked by the first regions 21.

As described above, the vehicle light sources 12 are arranged so as to be distributed in the second regions 22 on the roadway. Therefore, the driver of the vehicle 30 (30*a*, 30*b*) can visually recognize the second pedestrian crossing marked by the second regions 22 that emit light as shown in FIG. 4. The driver of the vehicle 30 (30*a*, 30*b*) can encourage the first pedestrian 31 to cross the roadway by temporarily stopping before the visually recognized second pedestrian crossing. As described above, it is relatively difficult for the pedestrian on the sidewalk (for example, the first pedestrian 31) to visually recognize the second pedestrian crossing marked by the second regions 22.

Step S103: The control unit 16 starts a second detection process for detecting a pedestrian who is crossing the roadway.

Specifically, the control unit 16 executes any image recognition processing using the video captured by the camera of the detection unit 13, and starts detecting a pedestrian who is crossing the roadway. The control unit 16 monitors the detected position of the pedestrian on the roadway. In the example shown in FIG. 5, the position of the first pedestrian 31 on the roadway while crossing the roadway is monitored.

Step S104: The control unit 16 starts to unmark the first pedestrian crossing from the first side (left side) to the second side (right side) while the first pedestrian 31 is crossing the roadway.

In the present embodiment, the control unit 16 unmarks the portion of the first pedestrian crossing that the first pedestrian 31 has passed as the first pedestrian 31 proceeds on the roadway. Specifically, each time the first pedestrian 31 passes one first region 21, the control unit 16 transmits, via the communication unit 14, a control signal instructing turning off to each of the pedestrian light sources 11 arranged in the one first region 21. Each of the pedestrian light sources 11 that has received the control signal is turned off. In the example shown in FIG. 5, of the five first regions 21 corresponding to the first pedestrian crossing, the two first regions 21 that the first pedestrian 31 has passed are unmarked (that is, each of the pedestrian light sources 11 arranged in the two first regions 21 is turned off), and are shown by a broken line.

Here, suppose that the entire first pedestrian crossing is left marked while the first pedestrian 31 is crossing the roadway. In this case, a pedestrian located on the sidewalk on the first side (left side) visually recognizes the first pedestrian crossing and determines that the pedestrian can cross the roadway, and thus can start crossing the roadway following the first pedestrian 31. When a large number of pedestrians starts crossing the roadway one after another following the first pedestrian 31, the vehicle 30 (30*a*, 30*b*) stopped before the first pedestrian crossing and the second pedestrian crossing cannot start, and traffic congestions may occur. However, according to the present embodiment, the first pedestrian crossing is sequentially unmarked from the first side (left side) while the first pedestrian 31 is crossing the roadway. The pedestrian located on the sidewalk on the first side (left side) visually recognizes that the first pedestrian crossing becomes unmarked from the first side (left side) and thus can determine that he/she cannot cross the roadway. Therefore, the occurrence of the inconvenience that a large number of pedestrians starts crossing the roadway one after another following the first pedestrian 31 and traffic congestion occurs is reduced.

The method of unmarking the first pedestrian crossing from the first side (left side) to the second side (right side) is not limited to the above example. For example, a method may be adopted in which the first pedestrian crossing is unmarked from the first side (left side) to the second side (right side) with the passage of time.

Step S105: The control unit 16 determines whether the first pedestrian 31 has finished crossing the roadway. When the control unit 16 determines that the first pedestrian 31 has finished crossing the roadway (step S105: Yes), the process proceeds to step S106. On the other hand, when the control unit 16 determines that the first pedestrian 31 has not finished crossing the roadway (step S105: No), the process repeats step S105.

Any method can be used for determining whether the first pedestrian 31 has finished crossing the roadway. For example, the control unit 16 may determine that the first pedestrian 31 has finished crossing the roadway when the position of the first pedestrian 31 acquired by the second detection process exceeds the end of the roadway on the second side (right side). In the example shown in FIG. 6, the first pedestrian 31 is located on the sidewalk beyond the end of the roadway on the second side (right side). In such a case, it can be determined that the first pedestrian 31 has finished crossing the roadway.

Here, when it is determined that the first pedestrian 31 has finished crossing the roadway and at least a part of the first pedestrian crossing is marked, the control unit 16 may unmark the at least the part of the first pedestrian crossing. In other words, the control unit 16 may start to unmark the first pedestrian crossing from the first side (left side) to the second side (right side) while the first pedestrian 31 is crossing the roadway, keep at least a part of the first pedestrian crossing marked until the first pedestrian 31 finishes crossing the roadway, and unmark the entire first pedestrian crossing when the first pedestrian 31 has finished crossing the roadway.

Step S106: When it is determined in step S105 that the first pedestrian 31 has finished crossing the roadway (step S105: Yes), the control unit 16 unmarks the second pedestrian crossing. After that, the process ends.

According to such a configuration, the second pedestrian crossing remains marked until the first pedestrian 31 finishes crossing the roadway. Therefore, even when the first pedestrian crossing starts to be unmarked in step S104, the driver of the vehicle 30 (30*a*, 30*b*) can visually recognize the marked second pedestrian crossing so that the driver can continue to temporarily stop until the first pedestrian 31 has finished crossing the roadway. Therefore, for example, the probability that the vehicle 30 (30*a*, 30*b*) will start before the first pedestrian 31 finishes crossing the roadway can be reduced, and the traffic safety can be improved.

Here, any method can be adopted for unmarking of the second pedestrian crossing. Hereinafter, three specific examples will be described.

Figure 6:
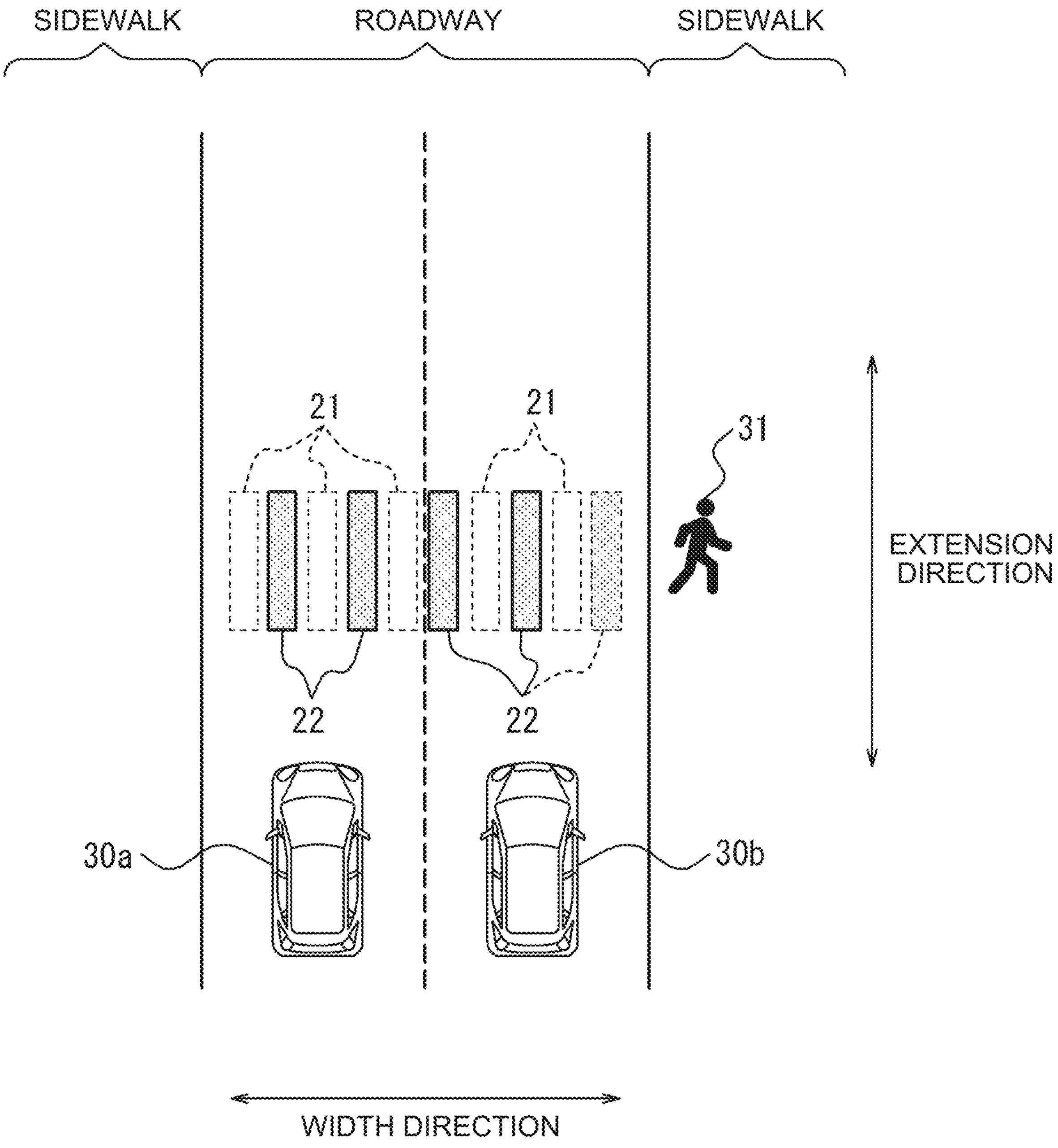
FIG. 6 is a diagram showing an example of the pedestrian crossing marked on the roadway.

In the first example, the control unit 16 unmarks the second pedestrian crossing from the second side (right side) to the first side (left side). Specifically, as shown in FIG. 6, for example, of the five second regions 22 corresponding to the second pedestrian crossing, the control unit 16 unmarks the first second region 22 from the second side (right side) (that is, each of the vehicle light sources 12 arranged in the first second region 22 is turned off). After that, the control unit 16 unmarks the remaining four second regions 22 in order from the second side (right side).

For example, in Japan, when the roadway includes a plurality of lanes, the lane farthest to the second side (rightmost side) is the passing lane. In the example shown in FIG. 6, the vehicle 30*a* is located in the normal lane and the vehicle 30*b* is located in the passing lane. In general, there is a demand that the vehicle 30 (30*a*) on the passing lane wants to move ahead of the vehicle 30 (30*b*) on the normal lane. According to the first example described above, in a country where the lane farthest to the second side (rightmost side) is defined as the passing lane, the second pedestrian crossing is unmarked from the passing lane side, so that the vehicle 30*b* can start before the vehicle 30*a*. Therefore, since the above demand is satisfied, smooth traffic can be achieved.

In the second example, contrary to the first example described above, the control unit 16 unmarks the second pedestrian crossing from the first side (left side) to the second side (right side). Specifically, of the five second regions 22 corresponding to the second pedestrian crossing, the control unit 16 unmarks the first second region 22 from the first side (left side). After that, the control unit 16 unmarks the remaining four second regions 22 in order from the first side (left side).

For example, in the United States or China, when the roadway includes a plurality of lanes, the lane farthest to the first side (leftmost side) is the passing lane, contrary to the above-mentioned example in Japan. In the example shown in FIG. 6, the vehicle 30*a* is located in the passing lane and the vehicle 30*b* is located in the normal lane. According to the second example described above, in a country where the lane farthest to the first side (leftmost side) is defined as the passing lane, the second pedestrian crossing is unmarked from the passing lane side, so that the vehicle 30*a* can start before the vehicle 30*b*. Therefore, since the above demand is satisfied, smooth traffic can be achieved.

In the third example, the control unit 16 unmarks the entire second pedestrian crossing at once. Specifically, the control unit 16 unmarks the five second regions 22 corresponding to the second pedestrian crossing at substantially the same time. Even in the third example, as described above, the probability that the vehicle 30 (30*a*, 30*b*) will start before the first pedestrian 31 finishes crossing the roadway can be reduced, and the traffic safety can be improved.

As described above, the marking device 10 according to the present embodiment includes the control unit 16 that marks the first pedestrian crossing to be visually recognized by a pedestrian who is going to cross the roadway and the second pedestrian crossing to be visually recognized by the driver of the vehicle 30 on the roadway. The control unit 16 marks the first pedestrian crossing and the second pedestrian crossing when one or more conditions including at least a condition that the first pedestrian 31 who is going to cross the roadway from the first side to the second side is detected are satisfied. The control unit 16 starts to unmark the first pedestrian crossing from the first side to the second side while the first pedestrian 31 is crossing the roadway. Then, when the first pedestrian 31 has finished crossing the roadway, the control unit 16 unmarks the second pedestrian crossing.

According to the present embodiment, the first pedestrian crossing is sequentially unmarked from the first side while the first pedestrian 31 is crossing the roadway. The pedestrian located on the sidewalk on the first side visually recognizes that the first pedestrian crossing becomes unmarked from the first side and thus can determine that he/she cannot cross the roadway. Therefore, a technique for causing a human being to recognize a pedestrian crossing on a road is improved because the occurrence of the inconvenience that a large number of pedestrians starts crossing the roadway one after another following the first pedestrian 31 and traffic congestion occurs is reduced.

Further, according to the present embodiment, the second pedestrian crossing remains marked until the first pedestrian 31 finishes crossing the roadway. Therefore, even when the first pedestrian crossing starts to be unmarked, the driver of the vehicle 30 (30*a*, 30*b*) visually recognizes the marked second pedestrian crossing so that the driver can continue to temporarily stop until the first pedestrian 31 has finished crossing the roadway. Therefore, a technique for causing a human being to recognize a pedestrian crossing on a road is improved because, for example, the probability that the vehicle 30 (30*a*, 30*b*) will start before the first pedestrian 31 finishes crossing the roadway can be reduced, and the traffic safety can be improved.

Although the present disclosure has been described above based on the drawings and the embodiment, it should be noted that those skilled in the art may make various modifications and alterations thereto based on the present disclosure. It should be noted, therefore, that these modifications and alterations are within the scope of the present disclosure. For example, the functions included in the configurations, steps, etc. can be rearranged so as not to be logically inconsistent, and a plurality of configurations, steps, etc. can be combined into one or divided.

For example, a part of the configuration of the marking device 10 according to the embodiment described above may be provided separately from the marking device 10. For example, the pedestrian light sources 11, the vehicle light sources 12, and the detection unit 13 may be separated from the marking device 10. In such a case, the present disclosure can be realized as a system including a plurality of pedestrian light sources 11, a plurality of vehicle light sources 12, a detection unit 13, and a marking device 10*a* including a communication unit 14, a storage unit 15, and a control unit 16.

Further, an embodiment is also possible in which, for example, a general-purpose computer functions as the marking device 10*a* according to the above modification of the embodiment. Specifically, a program describing processing contents for realizing each function of the marking device 10*a* according to the above embodiment is stored in the memory of the general-purpose computer, and the program is read out and executed by the processor. Therefore, the present disclosure can also be realized as a program that can be executed by the processor or a non-transitory computer-readable medium that stores the program.

Further, in the above-described embodiment, the control unit 16 of the marking device 10 may temporarily stop the first detection process of detecting a pedestrian who is going to cross the roadway, when the state where at least a part of the second pedestrian crossing is marked continues for a predetermined time. According to this configuration, it is possible to reduce the occurrence of the inconvenience in which, while the state where the second pedestrian crossing is marked continues for a relatively long time, the first pedestrian crossing and the second pedestrian crossing are marked again due to the detection of a new first pedestrian 31, causing traffic congestion.

Further, in the above-described embodiment, as the first example of the method of unmarking the second pedestrian crossing when the first pedestrian 31 has finished crossing the roadway, the method of unmarking the second pedestrian crossing from the second side (right side) to the first side (left side) has been described. Here, in the first example, suppose that there is a second pedestrian who is crossing the roadway from the second side (right side) to the first side (left side)(that is, in the opposite direction of the first pedestrian 31) when the first pedestrian 31 has finished crossing the roadway. In such a case, the control unit 16 of the marking device 10 may monitor the position of the second pedestrian on the roadway by the second detection process. The control unit 16 may unmark the portion of the second pedestrian crossing that the second pedestrian has passed as the second pedestrian proceeds on the roadway. According to this configuration, even when the first pedestrian 31 has finished crossing the roadway, at least a part of the second pedestrian crossing remains marked while there is a second pedestrian who is crossing the roadway in the direction opposite to that of the first pedestrian 31. Therefore, for example, the occurrence of the inconvenience such as, even though the second pedestrian is crossing, the entire second pedestrian crossing is unmarked and the vehicle 30 (30*a*, 30*b*) starts can be reduced.

What is claimed is:

1. A non-transitory storage medium storing a program for causing a marking device to perform a control method, the marking device marks, using a plurality of first light sources, a first pedestrian crossing to be visually recognized by a pedestrian who is going to cross a roadway and marks, using a plurality of second light sources, a second pedestrian crossing to be visually recognized by a driver of a vehicle on the roadway, the marking device including a controller configured to execute the control method stored in a storage, and a communication interface configured to communicate with the plurality of first light sources, the plurality of second light sources, and a detector, the control method comprising:

marking the first pedestrian crossing and the second pedestrian crossing when one or more conditions including at least a condition that a first pedestrian who is going to cross the roadway from a first side to a second side is detected using the detector are satisfied;

starting to unmark the first pedestrian crossing from the first side to the second side while the first pedestrian is crossing the roadway; and unmarking the second pedestrian crossing when the first pedestrian has finished crossing the roadway.

2. The non-transitory storage medium according to claim 1, wherein the marking device unmarks a portion of the first pedestrian crossing that the first pedestrian has passed as the first pedestrian proceeds on the roadway.

3. The non-transitory storage medium according to claim 1, wherein the control method further comprises:

starting a process of detecting a pedestrian who is going to cross the roadway; and temporarily stopping the process when a state where at least a part of the second pedestrian crossing is marked continues for a predetermined time.

4. The non-transitory storage medium according to claim 1, wherein the marking device unmarks the second pedestrian crossing from the first side to the second side when the first pedestrian has finished crossing the roadway.

5. The non-transitory storage medium according to claim 1, wherein the marking device unmarks the second pedestrian crossing from the second side to the first side when the first pedestrian has finished crossing the roadway.

6. The non-transitory storage medium according to claim 1, wherein the marking device unmarks the entire second pedestrian crossing once when the first pedestrian has finished crossing the roadway.

7. The non-transitory storage medium according to claim 1, wherein in a case where there is a second pedestrian who is crossing the roadway from the second side to the first side when the first pedestrian has finished crossing the roadway, the marking device unmarks a portion of the second pedestrian crossing that the second pedestrian has passed as the second pedestrian proceeds on the roadway.

* * * * *